(12) United States Patent
Webman et al.

(10) Patent No.: US 12,189,613 B2
(45) Date of Patent: Jan. 7, 2025

(54) CONCURRENCY CONTROL PROTOCOL AND SYSTEM THEREOF

(71) Applicant: Regatta Data Ltd., Bet Hanania (IL)

(72) Inventors: Erez Webman, Petach Tikva (IL); Irit Yadin-Lempel, Caesarea (IL)

(73) Assignee: Regatta Data Ltd., Bet Hanania (IL)

( * ) Notice: Subject to any disclaimer, the term of this patent is extended or adjusted under 35 U.S.C. 154(b) by 0 days.

(21) Appl. No.: 18/341,279

(22) Filed: Jun. 26, 2023

(65) Prior Publication Data
US 2024/0303230 A1    Sep. 12, 2024

Related U.S. Application Data

(60) Provisional application No. 63/489,481, filed on Mar. 10, 2023.

(51) Int. Cl.
*G06F 16/20* (2019.01)
*G06F 16/23* (2019.01)

(52) U.S. Cl.
CPC ...... *G06F 16/2379* (2019.01); *G06F 16/2315* (2019.01); *G06F 16/2336* (2019.01)

(58) Field of Classification Search
None
See application file for complete search history.

(56) References Cited

U.S. PATENT DOCUMENTS

| | | | |
|---|---|---|---|
| 5,263,155 A | | 11/1993 | Wang |
| 10,883,070 B2 * | | 1/2021 | Shcherbakov ........... C11D 7/02 |
| 2015/0347546 A1 | | 12/2015 | Pathak et al. |
| 2016/0371318 A1 | | 12/2016 | Hillel et al. |
| 2019/0179930 A1 * | | 6/2019 | Vandiver ............. G06F 16/2365 |
| 2020/0004736 A1 | | 1/2020 | Liu et al. |
| 2020/0026746 A1 * | | 1/2020 | Tu ........................... G06F 17/16 |
| 2022/0067029 A1 * | | 3/2022 | Murthy ................ G06F 16/278 |
| 2022/0413852 A1 * | | 12/2022 | Williams ............ G06F 9/30109 |

FOREIGN PATENT DOCUMENTS

| | | |
|---|---|---|
| CN | 114253920 A | 3/2022 |
| CN | 114443672 A | 5/2022 |
| CN | 114722121 A | 7/2022 |

OTHER PUBLICATIONS

International Search Report; PCT/IB2023/056586, Israel Patent Office, Jerusalem. Jul. 31, 2023.
Written Opinion of the International Searching Authority; PCT/IB2023/056585, Israel Patent Office, Jerusalem. Jul. 31, 2023.

* cited by examiner

*Primary Examiner* — Belix M Ortiz Ditren
(74) *Attorney, Agent, or Firm* — M&B IP Analysts, LLC (57) ABSTRACT

A method and system for managing execution of database transactions are provided. The method includes receiving at least one statement that is a part of a transaction, wherein the transaction is initiated by a client to be executed on a database system; executing tasks included in each of the at least one received statement in an optimistic manner, wherein the received at least one statement is not a commit statement; and returning the client an acknowledgement that the transaction is committed, wherein the acknowledgement is returned upon validation of the transaction, wherein the transaction is validated in a pessimistic manner, and wherein the at least one received statement is a commit statement.

29 Claims, 9 Drawing Sheets

CONCURRENCY CONTROL PROTOCOL AND SYSTEM THEREOF

CROSS-REFERENCE TO RELATED APPLICATIONS

This application claims the benefit of U.S. Provisional Application No. 63/489,481 filed on Mar. 10, 2023, the contents of which are hereby incorporated by reference.

TECHNICAL FIELD

The present disclosure generally relates to databases, and, specifically techniques for implementation of a concurrency control protocol to maintain serializability of concurrent operations in such databases.

BACKGROUND

In databases, concurrency control protocols ensure correct results for concurrent operations are generated as quickly as possible. Typically, a concurrency control protocol provides rules and methods typically applied by the database mechanisms to maintain the consistency of transactions operating concurrently, and thus the consistency and correctness of the whole database. Introducing concurrency control into a database would apply operation constraints which typically result in some performance reduction. Operation consistency and correctness should be achieved with as good as possible efficiency without reducing the database's performance. However, a concurrency control protocol can require significant additional complexity and overhead in a concurrent algorithm compared to the simpler sequential algorithm.

A concurrency control protocol can be implemented in database management systems, transactional objects, and distributed applications. Such a protocol is designed to ensure that database transactions are performed concurrently without violating the data integrity of the respective databases. Thus, concurrency control is an essential element for correctness in any database system where two database transactions or more, executed with time overlap, can access the same data, e.g., virtually in any general-purpose database system. There are different approaches for implementing a concurrency control protocol (or mechanism) in databases. The main approaches are: optimistic and pessimistic.

Some optimistic approaches, a check whether a transaction meets the isolation and other integrity rules (e.g., serializability) is typically performed when the transaction ends, without blocking any of the transaction's operations. Other optimistic approaches check whether a transaction meets the isolation and other integrity rules (e.g., serializability), without blocking any of the transaction's operations. When the isolation of the transaction is violated, the transaction is aborted. An aborted transaction is immediately restarted and re-executed, which incurs an overhead. As such, if too many transactions are aborted, the optimistic approach may be a disadvantage. In a pessimistic approach, an operation of a transaction is blocked when such an operation may cause a violation of consistency rules. In such cases, the operation is blocked until the possibility of violation of the transaction clears. The disadvantage of blocking operations involves performance reduction.

Different approaches for concurrency control in databases provide different performance. The selection of the best performing approach may be based on the type of transactions, the required performance, the type of databases, and applications accessing the database. However, the selection and knowledge about trade-offs are not always available, thus the implemented concurrency control approach may not be selected to provide the highest performance.

Further, some databases are designed where Atomicity, Consistency, Isolation, Durability (ACID) requirements are relaxed. In such databases, as multiple transactions can execute concurrently and independently of each other, such transactions access overlap. That could result in various inconsistencies. One method to ensure isolation between transactions and serialization in execution is by means of a well-designed concurrency control protocol.

It would therefore be advantageous to provide a new concurrency control protocol for optimizing the performance of databases.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Some embodiments herein relate to a method. For example, method may include receiving at least one statement that is a part of a transaction, where the transaction is initiated by a client to be executed on a database system. Method may also include executing tasks included in each of the at least one received statement in an optimistic manner, where the received at least one statement is not a commit statement. Method may furthermore include returning the client an acknowledgement that the transaction is committed, where the acknowledgement is returned upon validation of the transaction, where the transaction is validated in a pessimistic manner, and where the at least one received statement is a commit statement. Other embodiments of this aspect include corresponding computer systems, apparatus, and computer programs recorded on one or more computer storage devices, each configured to perform the actions of the methods.

Some embodiments herein relate to a non-transitory computer readable medium. For example, non-transitory computer readable medium may include receiving at least one statement that is a part of a transaction, where the transaction is initiated by a client to be executed on a database system. Non-transitory computer readable medium may also include executing tasks included in each of the at least one received statement in an optimistic manner, where the received at least one statement is not a commit statement. Medium may furthermore include returning the client an acknowledgement that the transaction is committed, where the acknowledgement is returned upon validation of the transaction, where the transaction is validated in a pessimistic manner, and where the at least one received statement is a commit statement. Other embodiments of this aspect include corresponding computer systems, apparatus, and computer programs recorded on one or more computer storage devices, each configured to perform the actions of the methods.

Some embodiments herein relate to a system. For example, a system may include one or more processors. System may also include a memory, the memory containing instructions that, when executed by the one or more processors, configure the system to: receive at least one statement that is a part of a transaction, where the transaction is initiated by a client to be executed on a database system. System may in addition include execute tasks included in each of the at least one received statement in an optimistic manner, where the received at least one statement is not a commit statement. System may moreover include return the client an acknowledgement that the transaction is committed, where the acknowledgement is returned upon validation of the transaction, where the transaction is validated in a pessimistic manner, and where the at least one received statement is a commit statement. Other embodiments of this aspect include corresponding computer systems, apparatus, and computer programs recorded on one or more computer storage devices, each configured to perform the actions of the methods.

Some embodiments herein relate to a database system. For example, a database system may include an interconnected network. Database system may also include a plurality of nodes connected through an interconnected network; where each node may include a storage including a plurality of data cells, one or more processors, and a memory, the memory containing instructions that, when executed by the one or more processors, configure the node to: receive at least one statement that is a part of a transaction, where the transaction is initiated by a client to be executed on a database system. Database system may furthermore include execute tasks included in each of the at least one received statement in an optimistic manner, where the received at least one statement is not a commit statement. Database system may in addition include return the client an acknowledgement that the transaction is committed, where the acknowledgement is returned upon validation of the transaction, where the transaction is validated in a pessimistic manner, and where the at least one received statement is a commit statement. Other embodiments of this aspect include corresponding computer systems, apparatus, and computer programs recorded on one or more computer storage devices, each configured to perform the actions of the methods.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, numerals refer to like parts through several views.

Some example embodiments provide a concurrency control protocol implemented into a database system (or simply a database). According to the disclosed embodiments, consistency of transactions, by means of the disclosed protocol, is achieved through isolating transactions and adopting different approaches during the execution phases of a transaction. In an embodiment, an optimistic approach is implemented, during the working phase of a transaction, to allow the operation of multiple transactions to run independently without any blocking or locks. For validation of a transaction, a pessimistic approach is taken, where a transaction may wait for other transaction(s) to commit. As a result, fewer transactions are aborted in comparison to a known implementation of optimistic concurrency control protocol, thereby improving the overall performance of the databases.

Further, the disclosed embodiments allow for performing higher parallelism in transactions working phase execution, relative to pessimistic solutions, while the state of the database at the end of the processing of such transactions would be as if the transactions are executed in serial. This allows fast execution of transactions and processing of more transactions at a given time period. Therefore, the disclosed embodiments provide a technical improvement over current database systems that, in most cases, fail to serve applications that require fast and parallel execution of transactions for retrieval and modification of datasets. The disclosed embodiments can be implemented in database systems as well as in data management systems, such as an object storage system, a key-value storage system, a file-system, and the like.

Figure 1:
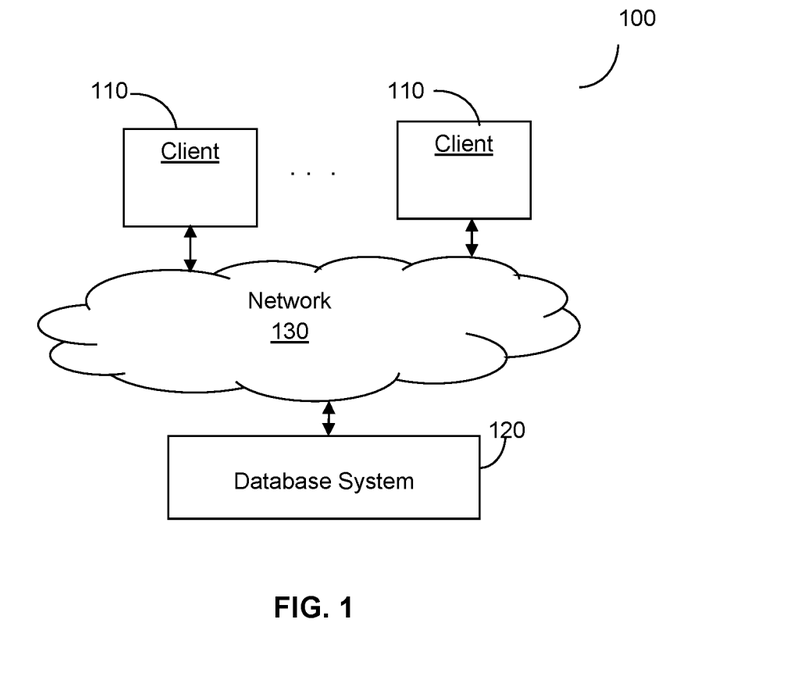
FIG. 1 is a network diagram of a distributed computing environment utilized to describe the various disclosed embodiments.

FIG. 1 shows an example network diagram 100 of a distributed computing environment utilized to describe the various disclosed embodiments. In the example network diagram 100, a plurality of clients 110 and a database system (or simply database) 120 are connected to a network 130. The network 130 may be, but is not limited to, wireless, cellular, or wired network, a local area network (LAN), a wide area network (WAN), a metro area network (MAN), the Internet, the worldwide web (WWW), similar networks, and any combination thereof.

Each client 110 is configured to access the database 120 through the execution of transactions. A client 110 may include any computing device executing applications, services, processes, and so on. A client 110 can run a virtual instance (e.g., a virtual machine, a software container, and the like).

In some configurations, clients 110 may be software entities that interact with the database 120. Clients 110 are typically located in compute nodes that are separate from the database 120 and communicate with the database 120 via an interconnect or over a network. In some configurations, an instance of a client 110 can reside in a node is part of the database 120.

The database 120 may be designed according to a shared-nothing or a shared-everything architecture. The transactions to the database 120 are processed without locks placed on data entries in the database 120. This allows for fast processing retrieval and modifications of data sets.

A transaction is issued by a client 110, processed by the database 120, and the results are returned to the client 110. A transaction typically includes the execution of various data-related operations over the database system 120. These operations are often originated by clients 110. The execution of such operations may be short or lengthier. In many cases, operations are independent and unaware of each other's progress.

A transaction can be viewed as an algorithmic program logic that potentially involves reading and writing various data-cells. A transaction, for example, may read some data-cells through one data operation, and then, based on the values read, can decide to modify other data-cells. That is, a transaction is not just an "I/O operation" but is more of a "true" computer program. A data cell is one cell of data. Data cells may be organized and stored in various formats and ways. Data cells, defined below, may be contained in files or other containers, and can represent different types (integer, string, and so on).

An execution of a transaction may be shared between a client and the database 120. For instance, in an SQL-based relational database, a client 110 interacts with the database using SQL statements. A client 110 can begin a transaction by submitting a SQL statement. That SQL statement is executed by the database 120. Depending on the exact SQL statement, the database 120 performs various read and/or write operations as well as invokes algorithmic program logic typically to determine which (and whether) data-cells are read and/or written. Once that SQL statement completes, the transaction is generally still in progress. The client 110 receives the response for that SQL statement and potentially executes some algorithmic program logic (inside the client node) that may be based on the results of the previous SQL commands, and as a result of that additional program logic, may submit an additional SQL statement and so on and so forth. At a certain point, and once the client 110 receives an SQL statement response, the client can instruct the database 120 to commit the transaction.

It should be noted that a client 110 can submit a transaction as a whole to the database 120, and/or submit multiple statements for the same transaction together, and/or submit a statement to the database 120 with an indication for the database to commit after the database 120 completes the execution of that statement.

It should be further noted that transactions may be abortable by the database 120 and/or a client 110. Often, aborting a transaction clear any of the transaction's activities.

For the sake of simplicity and ease of description, the following description, a reference would be made to a transaction initiated and committed by a client, and statements of the transaction are performed by the database 120. A transaction may include one or more statements. A statement may include, for example, an SQL statement. One of the statements may include a request to commit the transaction. In order to execute such a statement, the database may break the statement execution into one or more tasks, where each such task is running on a node. With this modelling, a task does not execute on more than a single node, but multiple tasks of the same statement can execute on the same node, if needed. A task is an algorithmic process that may require the execution of read operation(s) and/or write operations(s) on data cells. A transaction may be executed over the database 120 in three phases: working, validation, and commit. In some configurations, a transaction may be executed over the database 120 in two phases: working and commit. The embodiments carried by the disclosed concurrency control protocol in each phase are discussed in great detail below.

In an embodiment, the database 120 is a distributed database and may be realized as a relational database system (RDBMS) or a non-relational database. As will be demonstrated in FIG. 2 below, a distributed database is a configuration of multiple computers (hereinafter nodes) that may be situated in the same physical location, or in multiple locations. Such locations are typically not geographically distributed. The distribution arrangement of database 120 requires the execution of transactions and their operations on different nodes independent of each other.

Figure 2:
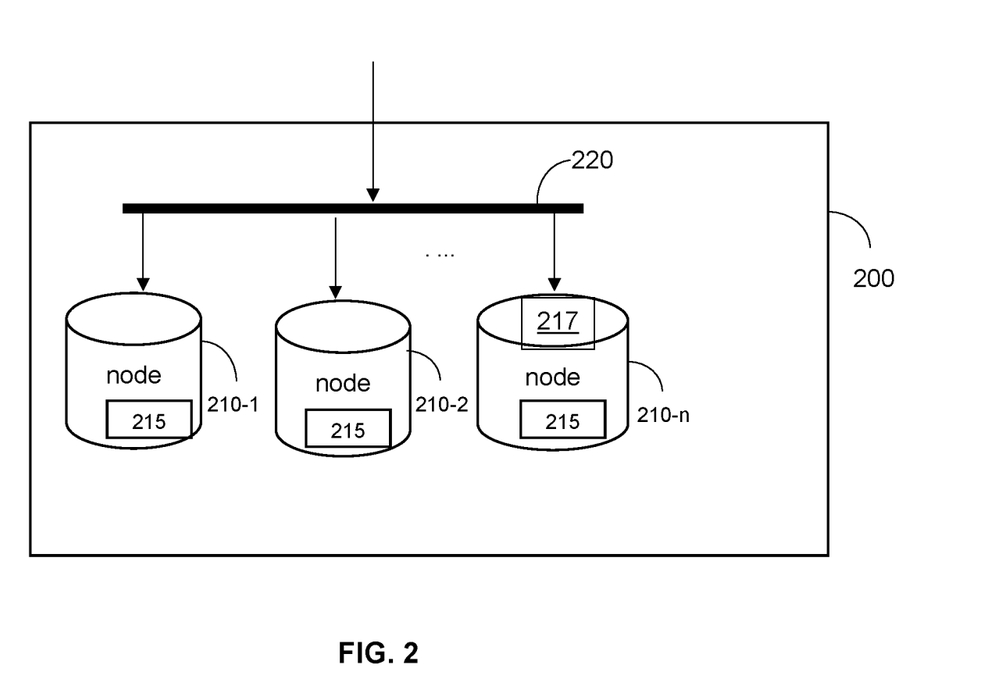
FIG. 2 is a block diagram of a database system arranged according to an embodiment.

FIG. 2 shows an example diagram of database 120 arranged according to an embodiment. The database 120 includes a plurality of nodes 210-1 through 210-n, which are distributed. In some configurations, the database 120 operates with one node as a non-distributed arrangement. Each node 210 may be realized as a physical device or a virtual instance executed on a physical device. A virtual device may include a virtual machine, a software container, a service, and the like. The physical device, an example of which is disclosed below, includes a least a processing circuitry and a memory. A physical device may also include a storage, a shared storage accessed by other nodes 210, or combination thereof. The storage stores the data maintained by the database 120. The nodes 210 may be deployed in one or more data centers, cloud computing platforms, and the like. The communication and synchronization among the nodes 210 is performed through an interconnect network 220.

In one embodiment, the nodes 210, and hence the database 120 are designed with a shared-nothing architecture. In such an architecture, nodes 210 are independent and self-sufficient as they have their own disk space and memory. As such, in the database 120, the data is split into smaller sets distributed across the nodes 210. In another embodiment, the nodes 210, and hence the database 120 are designed with a shared-everything architecture where the storage is shared among all nodes 210.

The data managed by the database can be viewed as a set of data-cells. While the most natural form of those data-cells would be items, such as what relational databases refer to as "column cells", those data-cells can actually be any type of data, data-object, file, and the like.

Databases often organize a higher level of a data object referred to as data-row (or simply row). A data-row may include a collection of specific data-cells. For example, in relational databases, a set of rows form a database table.

Typically, all the data-cells of a specific row reside in close proximity (e.g., consecutively) on the storage device, as this can ensure that multiple cells of the same row (or all the cells of the row) can be read from the disk more cheaply (e.g., with a single small disk I/O) than if those cells would each be stored elsewhere on the disk (e.g., with n disk I/Os to n different disk locations in order to retrieve n cells of the same row). Further, the metadata for managing the data-cell information may also be organized in a rougher resolution as it may result in meaningfully lesser and smaller overall metadata.

In one configuration, and without limiting the scope of the disclosed embodiments, a single cell, and a single row may reside in a specific storage device of a node 210. However, it should be noted that a row can be divided across multiple nodes. It should be further noted that the disclosed embodiments can be adapted to operate in databases where data cells are stored and arranged in different structures.

An operation of a task may access a single data cell in a single node 210. Furthermore, multiple operations (of the same or different transactions) may access the same data cells simultaneously or substantially at the same time. There is no synchronization when such operations, tasks, or statements of a transaction or transactions are performed. In a typical computing environment, hundreds of concurrent transactions can access the database 120. As such, maintaining and controlling the consistency of transactions and their operations is a critical issue to resolve in databases.

In an embodiment, each node 210 includes an agent 215 configured to manage access to data stored on the respective node. The agent 215 may be realized in hardware, software, firmware, or combination thereof. Software shall be construed broadly to mean any type of instructions, whether referred to as software, firmware, middleware, microcode, hardware description language, or otherwise. Instructions may include code (e.g., in source code format, binary code format, executable code format, or any other suitable format of code).

The agent 215 is configured to manage the contents of data cells and operations within a node. For example, when a write operation requires access to data cell(s), the agent 215 may be configured to point to the requested cell(s). In an embodiment, each transaction is managed by a transaction manager 217. A transaction manager 217 is an instance executed over one of the nodes 210 and configured to orchestrate the execution of a transaction across one or more nodes 210. The transaction manager 217 may be instantiated on any node 210. In the example shown in FIG. 2, the node 210 is shown on FIG. 2, the manager 217 runs on the node 210-n. The transaction manager 217 can be realized as a software object, a script, and the like executed over the hardware of a respective node 210. It should be noted that multiple transaction managers may be executed on one node or multiple nodes, where each transaction manager handles a single transaction.

Figure 3:
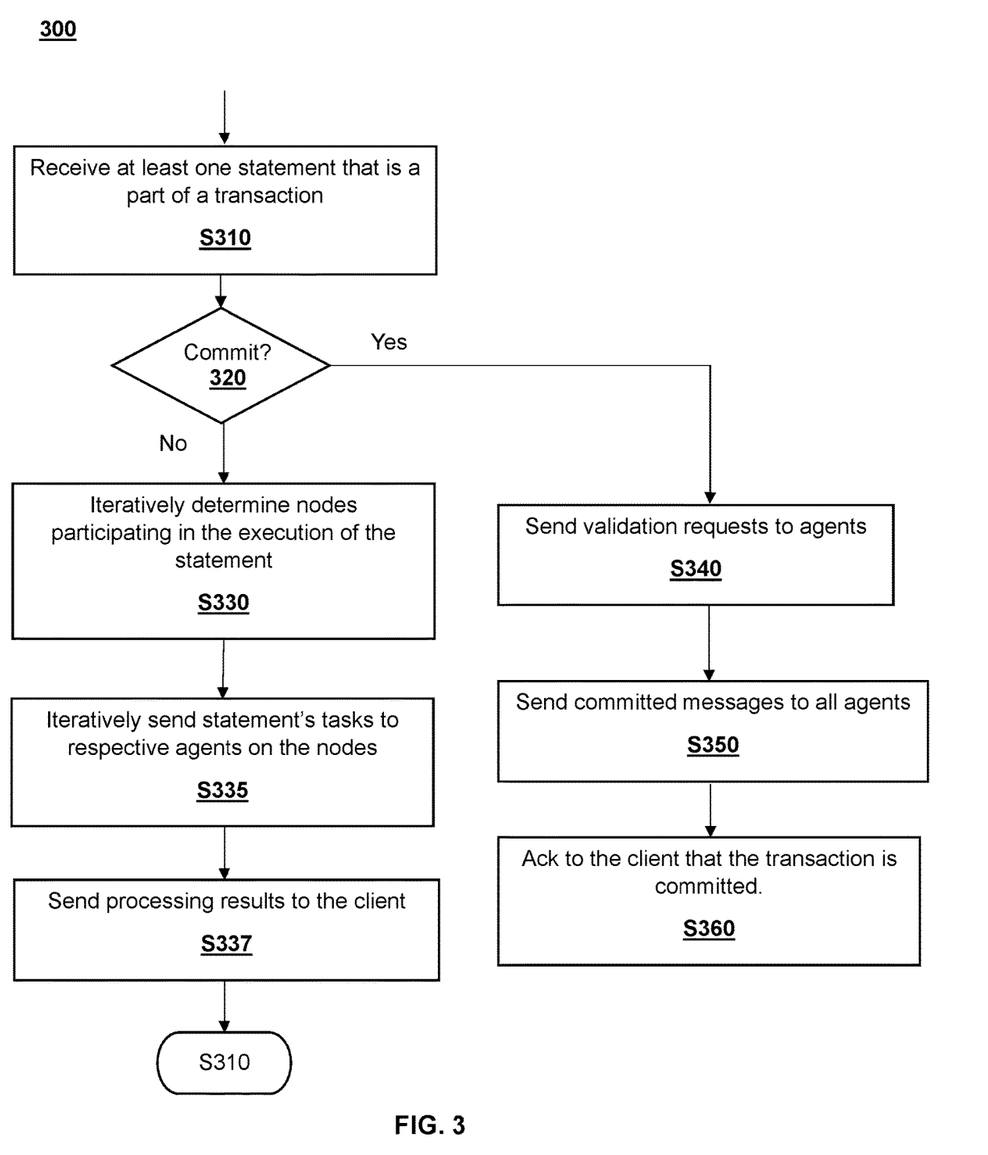
FIG. 3 is a flowchart of a method of operation of a transaction manager, according to an embodiment.

FIG. 3 shows an example flowchart 300 of a method for managing an execution of a transaction in the database 120 according to an embodiment. The method can be performed by a transaction manager instantiated on one of the nodes, such nodes as 210, FIG. 2.

At S310, at least one statement that is part of a transaction initiated by a client is received. A transaction may include a collection of statements, each of which may include a collection of tasks. A task may require the execution of read operation(s), write operation(s), or both. A task may be a program or logic typically executed by an agent. A read operation requires reading data from a data cell while a write operation requires writing data to a data cell. A statement may include a commit statement thereby committing the transaction.

At S320, it is checked if a received statement is a commit statement, and if so execution continues with S340; otherwise, execution continues with S330.

At S330, nodes (210, FIG. 2) participating in the execution of tasks associated with the received statements are determined. There are different techniques to determine such nodes. For example, a node can be determined based on an index pointing to where data cells to be accessed are located. The techniques to determine nodes of such that are outside of the scope of the disclosed embodiments.

At S335, the tasks are sent to determined nodes. Such nodes process the tasks that are part of a received statement. In an embodiment, a list of the determined agents participating in the working phase of the statement is maintained. Further, for each such agent, it is determined if the agent performs at least one write operation, during the entire execution of a transaction. The execution of such operations by an agent (215) during a working phase is discussed in greater detail below. It should be noted that S330 and S335 may be performed iteratively as part of the execution of one task, when it is determined that another task is required. It should be further noted S330 and S335 may be performed in parallel or, at certain times, at a different order.

At S337, at the end of the execution of all tasks associated with the received statement, a response is sent back to the client with the results of the processing of the statement. Then, execution returns to S310.

Execution reaches S340, when a commit statement is received from the client. At this stage, a validation request is sent to every agent that performed a write operation during execution of the received transaction. The validation process of write operations performed by the agent during a validation phase is discussed with reference to FIG. 7. In an embodiment, each agent performing a validation will take a commit pause at the end of the validation process. The commit pause is taken to enable the atomicity of the distributed transaction commitment, by preventing race conditions between the committing transaction that completed its validation and other transactions that may then attempt to read data-cells that were modified by the committing transaction.

At S350, upon receiving validation confirmation messages from agents that performed write operations, committed messages are sent to all agents that participated in the execution of the transactions. It should be noted that here the committed messages are sent to all agents participating in the execution of the statement regardless of if such agents performed write operations, or not. A committed message indicates to the agent to commit the operations performed and to release the commit pause taken during the validation phase. At S360, an acknowledgment is sent to the client that the transaction is committed. It should be noted that S350 and S360 can be performed in parallel or in a different order.

As can be understood from the above description, the operation of a transaction manager carries through three phases: working, validation, and commit. In the working phase, one or more statements of a transaction are processed. In the validation phase, all data cells that have been written through the transaction are validated. In the commit phase, the entire transaction is committed.

Figure 4A:
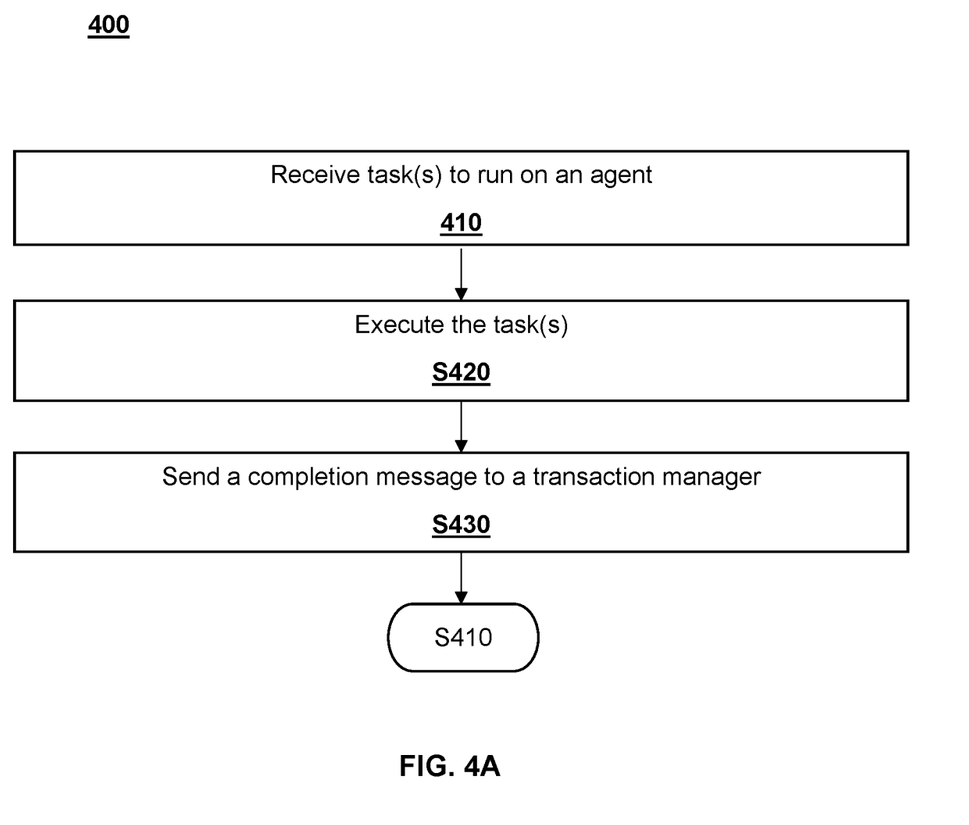
FIG. 4A is a flowchart of a method of operation of an agent executed on a node during a working phase of a transaction according to an embodiment.

FIG. 4A shows an example flowchart 400 describing a process performed by an agent during a working phase of a transaction according to an embodiment. The process shown in FIG. 4 can be performed by any agent running on any node being required to execute a statement or an operation of a transaction. Further, an agent on a node can handle the executions of multiple transactions, i.e., an agent is not limited to handling operations of a single transaction. At S410, a task associated with a statement is received from a transaction manager. The transaction manager can be an instance running on the same node of the agent receiving the task or on a different node than the agent. An agent may execute one or more tasks that may require write operations (write to a data cell) or read operations (read from a data cell). Note an agent may also execute a task that does not require a read or write operation. A task may include communication with other agents and/or transaction managers. The operation does not include any validation or commit requests.

At S420, the task received at S410 is performed. The task execution may involve read and write operations. Generally, a read operation would include reading the contents of a data cell. A write operation would include writing data to a data cell initially in an uncommitted matter. To maintain consistency and ensure serializability of concurrent transactions, the execution of both read and write operations requires implementing some logic, as discussed in greater detail with reference to FIGS. 5 and 6 below.

The disclosed protocol maintains concurrency while performing read and write operations. However, it should be noted that an agent can execute other tasks that do not require reading or writing data. For example, an agent may run a network task for transferring data or commands to another node or to the transaction manager. For example, an agent running on node 210-1 can request an agent running on node 210-n to perform a certain task.

At S430, a message is sent to the transaction manager that the execution of the task associated with the statement received at S410 is completed. Then, execution returns to S410. The process 400 is performed for each task associated with a statement. Thus, the process 400 can be called for execution of each task associated with a statement, as long as no validation request is received from a transaction manager. It should be noted that statements and tasks associated with a transaction can be executed on multiple nodes during the working phase.

Figure 4B:
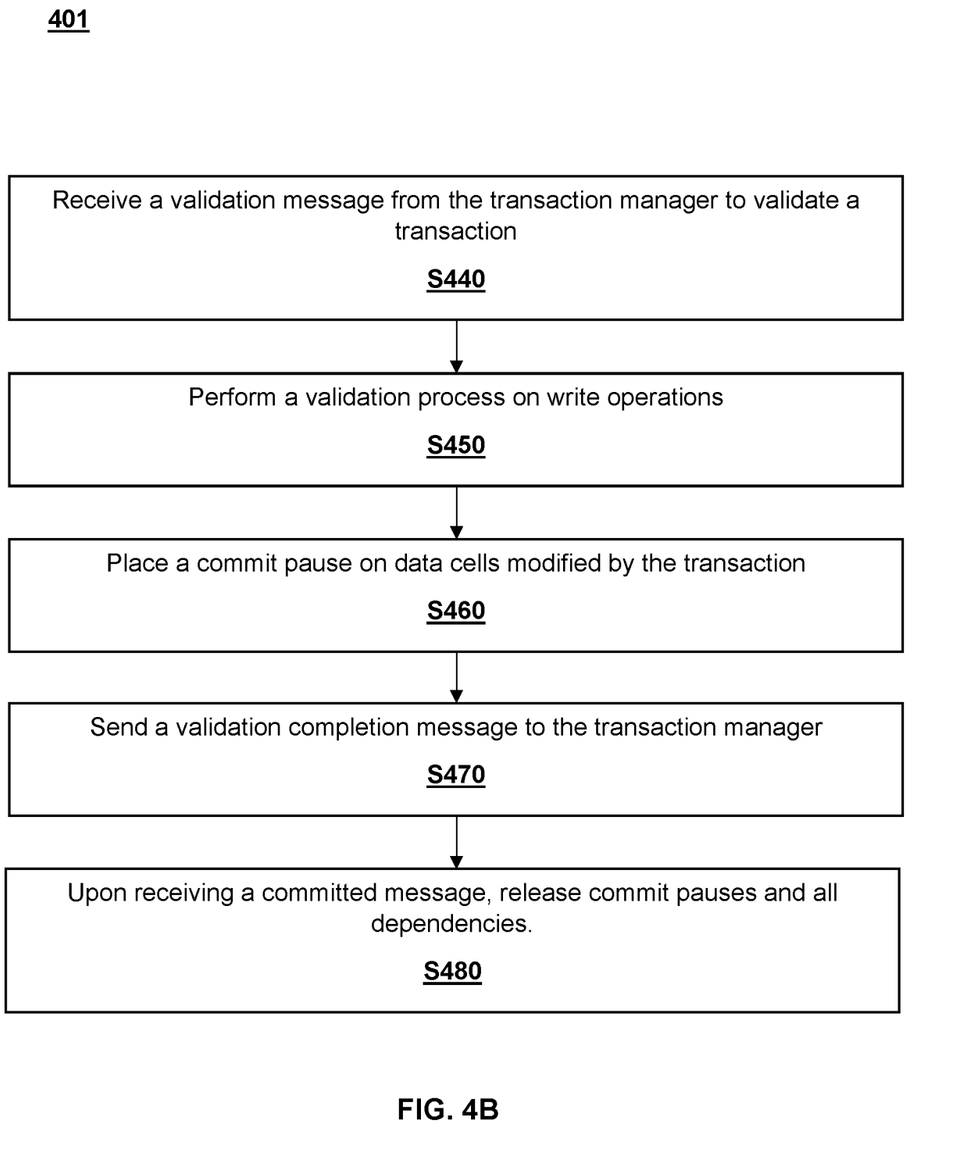
FIG. 4B is a flowchart of a method of operation of an agent executed on a node during a validation phase and a commit phase of a transaction according to an embodiment.

FIG. 4B shows an example flowchart 401 describing a process performed by an agent during validation and commit phases of a transaction according to an embodiment. The validation phase starts when the transaction manager receives a commit statement from the client that issued the transaction.

At S440, a validation request is received from the transaction manager. In an embodiment, such a request is received only by agents that performed write operations as there is no need to validate read operations.

At S450, a validation process of all write operations is performed. That is, all write operations taken place, by the agent, during the execution of the transaction are validated. Generally, S450 includes verifying that are no conflicting transactions reading from the data cell(s) modified by the validating transaction. The operations of S450 are described in greater detail below with reference to FIG. 7.

At S460, upon completion of the validation phase, a commit pause is placed on data cells modified by the transaction. The commit pause is taken to enable the atomicity of the distributed transaction commitment, by preventing race conditions between the committing transaction that completed its validation and other transactions that may then attempt to read data-cells that were modified by the committing transaction. prevents race conditions between the committing transactions and other transactions. In another embodiment, to improve performance and reduce the wait time at S565, commit pauses are not taken immediately as the validation phases complete but instead are deferred until instructed by the transaction manager.

At S470, a validation completion message is sent to the transaction manager. As noted above, the transaction manager waits for all agents participating in the execution of the transaction to send a validation completion message in order to commit the transaction. To this end, at S480, upon receiving a committed message from the transaction manager, the commit pauses that the committing transaction placed and all dependencies associated with the committed transaction are released. Furthermore, when a transaction that wrote to data cells commits, the contents of the data cells become "committed" to override data currently stored in data cells. Note that the commit pauses that are released are only the commit pauses that the committing transaction placed, further any write to data cells happens before the commit pause is released. For example, suppose a commit pause was placed by a committing transaction TR1 on data cell DC1 and another committing transaction TR2 placed a commit pause on DC1. When committed message was received for TR1, the commit pause of TR1 on DC1 will be released but the commit pause of TR2 on DC1 will not be released at that time.

The execution of read and write operations by an agent requires maintaining two vectors: read and write by each agent for each transaction. A read vector is maintained for each transaction that read one or more data cells, and a write vector is maintained for each transaction that wrote one or more data cells. The size of the read and write vectors of each transaction depends on the number of data cells it read and wrote respectively. The read and write vectors are updated and scanned during the working and validation phases to avoid situation of data conflicts. It should be noted that scanning the vectors is only one technique that can be used herein, for example, by means of lookup tables.

Figure 5:
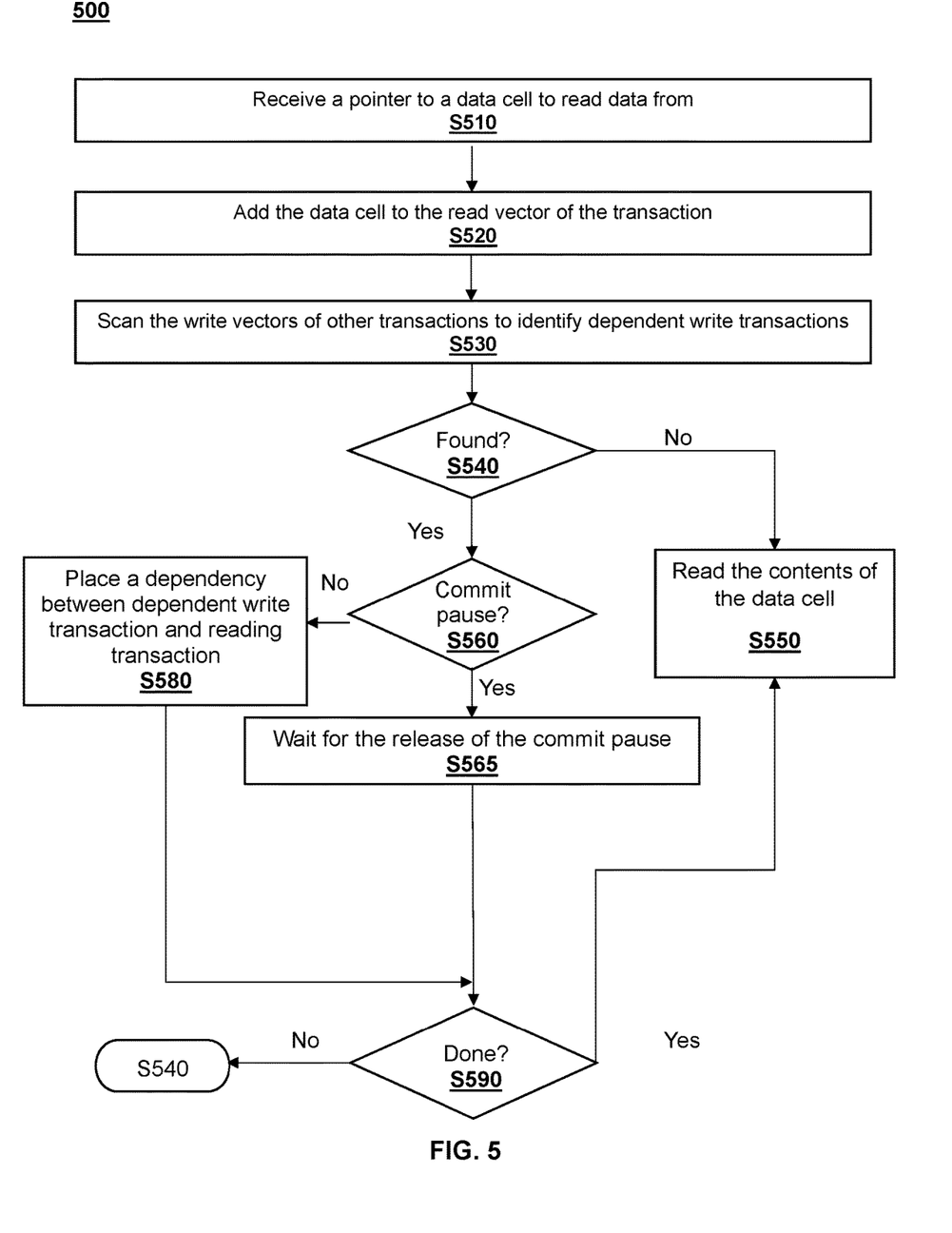
FIG. 5 is a flowchart of a read operation according to an embodiment.

FIG. 5 shows an example flowchart 500 for executing a read operation by the agent according to an embodiment. A read operation is part of a statement reading the contents of a data cell.

At S510, a pointer to a data cell to be read is received or otherwise determined by the agent. The pointer may include an address, a location, an identifier, and the like.

At S520, an entry is added to a read vector of the transaction (that read operation is part of), designating the data cell being read. The read vector is maintained by the agent and there is a read vector per transaction per agent.

At S530, all write vectors of all other transactions are scanned to identify dependent write transactions. That is, a dependent write transaction is a transaction that wrote (through a write operation) to the data cell being read but have not committed yet. For example, WR_TR1 and WR_TR2 are write vectors of "write" transactions (TR1 and TR2) and RD_TR3 is the read vector of transaction TR3, where a read operation of TR3 is currently being processed. All transactions TR1, TR2, and TR3 involve tasks that are executed on the same or by a specific agent.

| WR_TR1 | DC001 | DC003 | . . . | . . . |
| WR_TR2 | DC004 | DC027 | DC030 | . . . |
| RD_TR3 | DC001 | | | |

From the above example, transaction TR1 is dependent on transaction TR3 as both operate (or access) on data cell 'DC001'. Thus, TR1 is a dependent write transaction. In general, "write transactions" depend on "read transactions".

At S540, it is checked if there are any dependent write transactions. If not, execution continues with S550 where the contents of the data cell is being read. In this example, data cell 'DC001' is being read. Otherwise, at S560, for each dependent write transaction, it is checked, if there is a commit pause was placed on that data cell by that dependent transaction. For example, it is checked if a commit pause placed by TR1 on cell DC001. If S560 results with a 'yes' answer, execution waits, at S565, until that commit pause is released. This could occur either if the dependent transaction (e.g., TR1) is committed or aborted. If S560 results with a 'no' answer, execution continues with S580. In some scenarios, the transaction manager can break the commit pause. In an example embodiment, the transaction manager can instruct any agent to release a commit pause the agent holds as long as the transaction waiting to commit has not yet proceeded with commitment. Such an agent may then release its commit pause, effectively unblocking any potentially blocked reading transactions.

Execution reaches S580 when there is no commit pause placed on the data cell by the dependent transaction. In this case, at S580, a dependency is placed between the dependent write transaction (e.g., TR1) and the transaction requesting the read operation (e.g., TR3), that is, a "write transaction" depends on a "read transaction". The dependencies between such transactions can be maintained, by the agent, in a graph, or any other type of data structure. It should be noted that S560 through S580 are performed for each dependent write transaction.

At S590, it is checked if all dependent write transactions have been checked through the logic realized by S560 through S580. If so, the method proceeds to S550 where the contents of the data cell is being read; otherwise, execution returns to S540. It should be noted that S540, S550, S560, S565, S570, S580, and S590 are performed for each read dependent write transaction identified at S530.

Figure 6:
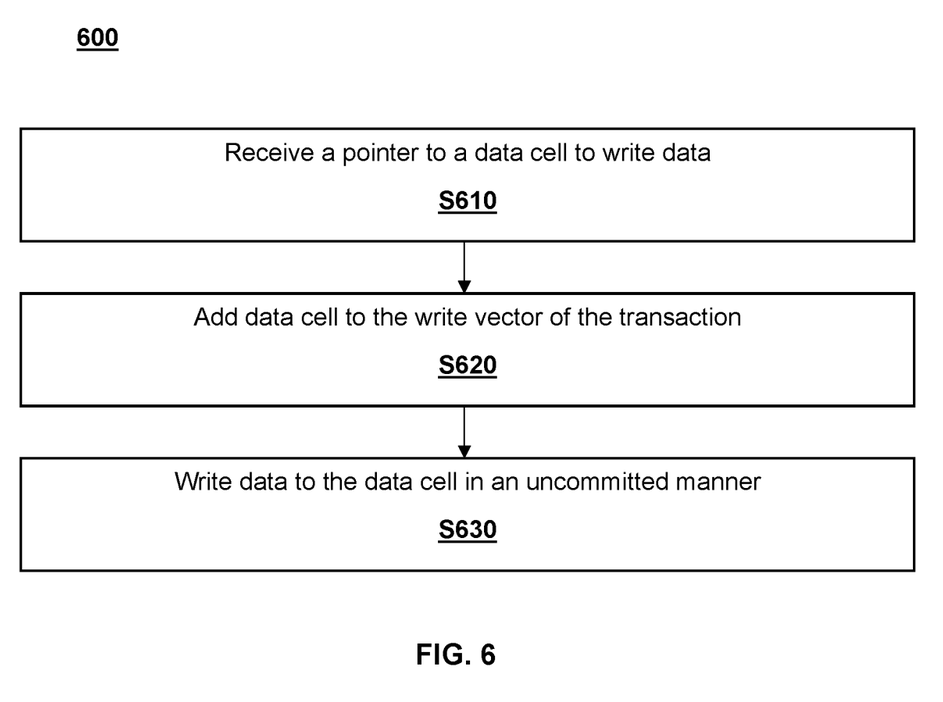
FIG. 6 is a flowchart of a write operation in a database system according to an embodiment.

FIG. 6 shows an example flowchart 600 for executing a write operation by the agent according to an embodiment. A write operation is part of a statement of a transaction when data is written to a data cell.

At S610, a pointer to a data cell to be accessed and data to be written are received or otherwise determined by the agent. The pointer may include an address, a location, an identifier, and the like.

At S620, an entry is added to a write vector of the transaction (that write operation is part of) designating new data is being written the data cell. The write vector is maintained by the agent and there is a write vector per transaction per agent.

At S630, the data is written to the data cell in an uncommitted manner using a technique that does not override data stored in data cells. Writing data in an uncommitted manner is performed to ensure that if the transaction requesting the write operation has not committed yet, currently "committed" data stored in the data cell will still be available for transactions requesting read operations. As noted above, reading the contents of the data cells can be performed while other transactions are writing or wrote the data to a data cell is being read. It should be noted that if two transactions (TR20 and TR21) are writing the same data-cell DC1 in an uncommitted manner, then each of those transactions have their own "versions" of the content of DC1.

Figure 7:
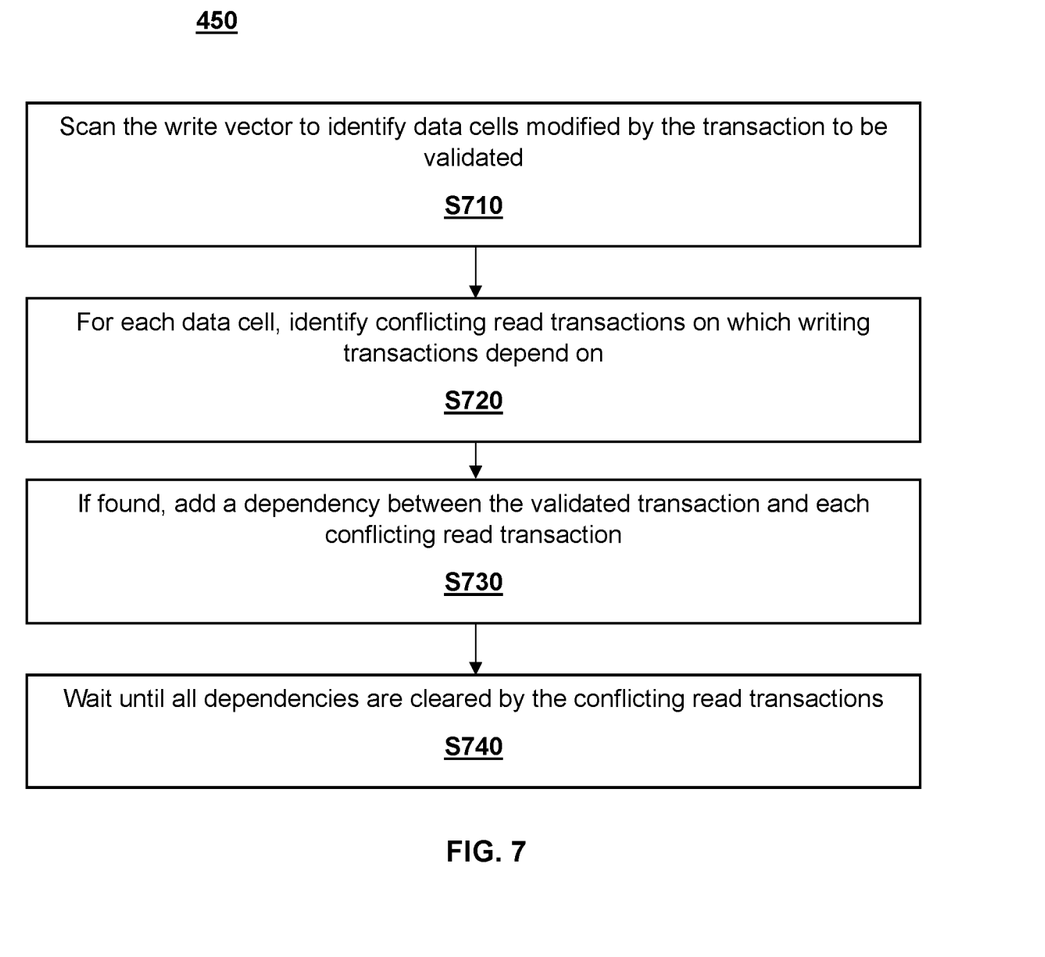
FIG. 7 is a flowchart of a process for validating a write transaction in the database system according to an embodiment.

FIG. 7 shows an example flowchart S450 describing a process for validating a transaction that performed write operation(s) according to an embodiment. The process shown in FIG. 7 can be performed by any agent running on a node that performed one or more write operations for a transaction being validated.

At S710, the write vector of a transaction to be validated is iteratively scanned for data cells that the transaction wrote to by that agent. At S720, for each such data cell, all active transactions that read from the cell are identified. This can be performed by, for example, scanning the read vectors maintained by the agent. As an example, RD_TR5 and RD_TR6 read vectors of "read transactions" (TR5 and TR6), respectively, and WR_TR7 is a write vector of a transaction TR7 being validated. All transactions TR5, TR6, and TR7 involve tasks that are executed on the same or by a specific agent.

| RD_TR5 | DC011 | DC013 | ... | ... |
| RD_TR6 | DC014 | DC127 | DC130 | ... |
| WR_TR7 | DC011 | DC127 | ... | ... |

From the above example, the transaction TR7 wrote to data cells 'DC011' and DC127' that were both read by transactions TR5 and TR6, respectively. Such transactions (if they have not been committed yet) are considered as conflicting read transactions.

At S730, a dependency is placed between the transaction being validated and each of the identified conflicting read transactions, such that the transaction being validated depends on the identified conflicting read transactions. As noted above, such dependencies can be maintained, by the agent, in a graph, or any other type of data structure. In the above example, the transaction to be validated is WR_TR7 and dependency is placed between TR7 and TR5, TR6. As can be understood, the transaction being validated, and conflicting read transactions are not the same transactions.

At S740, execution waits until all identified dependencies are cleared. That is, the wait is for all conflicting read transactions to commit. Thereafter, when all dependencies are cleared, a commit pause is placed and a validation completion message is sent, as discussed in FIG. 4. It should be noted that read and write vectors maintained for a transaction are deleted when the transaction commits. It should be further noted that when a transaction that wrote to data cells commits, the contents of the data cells become "committed" to override data currently stored in data cells.

According to the disclosed embodiments, consistency of transactions is achieved through the isolation of transactions and adopting different approaches during the phases of transaction execution. For example, during a working phase, an optimistic approach is implemented, where each transaction runs independently, and no locks are taken. During a validation phase, a pessimistic approach is taken where a transaction may wait for other transaction(s) to commit. As a result, fewer transactions need to abort.

In some instances, two or more transactions may write to the same data cells on different nodes and commit substitutable at the same time. For example, transactions TR5 and TR6 write to data cell (DC1) on node 210-1 and to data cell (DC5) on node 210-n. In such instances, the order of transactions may not be properly maintained. In one embodiment, in order to guarantee that the order of commitment is the same on both nodes and ensure serializability execution of the transactions before placing a commit pause on a data cell (at the end of the validation phase of a transaction), it is already checked if there is already a commit pause on the specific data cell. If so, an agent informed the transaction manager that a commit pause cannot be placed, and thus the transaction cannot commit. The transaction manager may release the commit pause and have the transaction re-executed, or wait for the transaction holding the commit pause to commit.

In one embodiment, in order to guarantee that the order of commitment is the same on both nodes, thereby ensuring serializability execution of the transactions, a sequencer is being utilized. A sequencer is an instance executed in the database (120, FIG. 1) and configured, in part, to maintain the order when transactions commit. In this embodiment, when the transaction manager is ready to commit, a request is sent to the sequencer to receive a commit time slot. The sequencer synchronizes among all transaction managers when transactions can commit and thus commit their respective transaction. In an embodiment, the sequencer manages a logical clock being advanced at each request for a commit time slot. This ensures that order of commit of transaction will be always maintained.

As disclosed herein, a pessimistic approach is employed during the validation phase. In some situations, the validation of transactions can result in a deadlock between two or among three or more transactions, resulting in the inability of such transactions to commit. To this end, a deadlock detection and/or prevention mechanisms can be utilized with the disclosed protocol. There are several implementations of deadlock detection and prevention mechanism disclosed in the related art, and such a mechanism is outside the scope of the disclosed embodiments.

Figure 8:
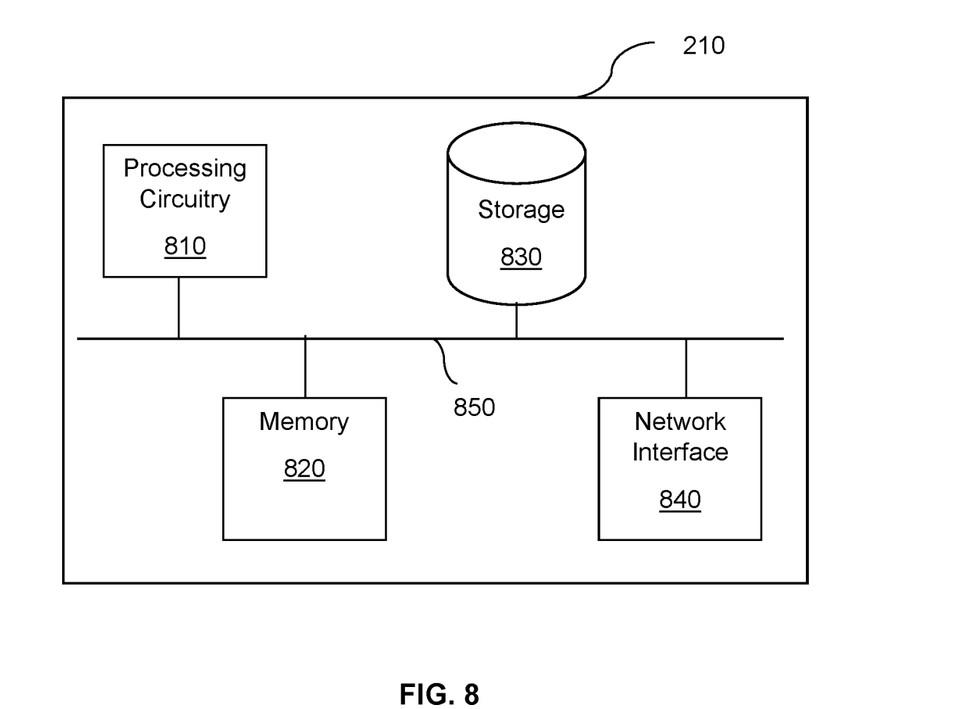
FIG. 8 is a schematic diagram of a controller according to an embodiment.

FIG. 8 is an example schematic diagram of a hardware layer of a node 210 in a database 1210 according to an embodiment. The node 210 includes a processing circuitry 810 coupled to a memory 820, a storage 830, and a network interface 840. In an embodiment, the components of the node 210 may be communicatively connected via a bus 850.

The processing circuitry 810 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 820 may be volatile (e.g., random access memory, etc.), non-volatile (e.g., read only memory, flash memory, etc.), or a combination thereof.

In one configuration, software for implementing one or more embodiments disclosed herein may be stored in the storage 830. In another configuration, the memory 820 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 810, cause the processing circuitry 810 to perform the various processes described herein.

The storage 830 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 840 allows the node to communicate with, for example, other nodes or with a transaction manager. It should be understood that the embodiments described herein are not limited to the specific architecture illustrated in FIG. 8, and other architectures may be equally used without departing from the scope of the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be plural and vice versa with no loss of generality. In the drawings, like numerals refer to like parts through several views.

The various embodiments disclosed herein can be implemented as hardware, firmware, software, or any combination thereof. Moreover, the software is preferably implemented as an application program tangibly embodied on a program storage unit or computer-readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

What is claimed is:

1. A method for managing execution of database transactions, comprising:
receiving at least one statement that is a part of a transaction, wherein the transaction is initiated by a client to be executed on a database system;
executing tasks included in each of the at least one received statement in an optimistic manner, wherein the received at least one statement is not a commit statement, wherein a task of the tasks includes execution of a read operation by:
receiving a pointer to a data cell to be read;
adding the data cell to a read vector;
determining whether there is at least one write operation dependent on the read operation, wherein a dependent write operation is executed by a transaction different from the transaction initiated by the client; and
for each dependent write operation having a commit pause placed on the data cell to be read, waiting for the commit pause to be released; and
returning the client an acknowledgement that the transaction is committed, wherein the acknowledgement is returned upon validation of the transaction, wherein the transaction is validated in a pessimistic manner, and wherein the at least one received statement is a commit statement.

2. The method of claim 1, further comprising:
determining whether the at least one received statement is a commit statement.

3. The method of claim 1, wherein executing the transaction in an optimistic manner includes allowing statements of other transactions to independently access same data cells in the database system being modified by tasks of the at least one received statement.

4. The method of claim 1, wherein validation of a transaction in a pessimistic manner includes waiting for other transactions to commit.

5. The method of claim 1, wherein executing tasks included in each of the at least one received statement further comprises:
determining nodes participating in an execution of tasks of the statement;
sending the tasks to the determined participating nodes; and
sending processing results of the statement to the client.

6. The method of claim 1, wherein the transaction includes a collection of statements, wherein each of the least one statement causes execution of one or more tasks.

7. The method of claim 6, wherein a task includes execution of at least one read operation, at least one write operation, or both.

8. The method of claim 1, further comprising: placing a dependency between a dependent transaction performing a write operation and the transaction requesting the read operation, when there is no commit pause placed on the data cell to be read.

9. The method of claim 8, further comprising:
reading contents of the data cell when there are no dependent write operations, wherein a dependency between the read operation and write operation and a commit pause are released over time.

10. The method of claim 1, wherein the task includes a write operation, and wherein executing the write operation further comprises:
receiving a pointer to a data cell to write data;
adding the data cell to a write vector of the transaction; and
writing new contents to the data cell in an uncommitted manner, thereby allowing original contents of the data cell and the new contents to co-reside.

11. The method of claim 1, further comprising
causing a validation of each write operation performed during execution of the received transaction.

12. The method of claim 11, further comprising:
placing a commit pause on any data cell modified by each of the write operation, wherein the commit pause enables an atomicity of a distributed transaction commitment;
scanning a write vector of the transaction to identify data cells modified by each of the write operation;
for each identified data cells, identifying conflicting read operations, wherein a conflicting read operation is a read operation of a transaction different from the transaction;
placing a dependency between the transaction and a transaction executing the conflicting read operation.

13. The method of claim 12, further comprising:
waiting until dependencies between the transaction and conflicting read operation are released; and
returning a validation acknowledgement.

14. A non-transitory computer readable medium having stored thereon instructions for causing a processing circuitry to execute a process, the process comprising:
receiving at least one statement that is a part of a transaction, wherein the transaction is initiated by a client to be executed on a database system;
executing tasks included in each of the at least one received statement in an optimistic manner, wherein the received at least one statement is not a commit statement; wherein a task of the tasks includes execution of a read operation by:
receiving a pointer to a data cell to be read;
adding the data cell to a read vector;
determining whether there is at least one write operation dependent on the read operation, wherein a dependent write operation is executed by a transaction different from the transaction initiated by the client; and
for each dependent write operation having a commit pause placed on the data cell to be read, waiting for the commit pause to be released; and
returning the client an acknowledgement that the transaction is committed, wherein the acknowledgement is returned upon validation of the transaction, wherein the transaction is validated in a pessimistic manner, and wherein the at least one received statement is a commit statement.

15. A system for managing execution of database transactions comprising:
one or more processors;
a memory, the memory containing instructions that, when executed by the one or more processors, configure the system to:
receive at least one statement that is a part of a transaction, wherein the transaction is initiated by a client to be executed on a database system;
execute tasks included in each of the at least one received statement in an optimistic manner, wherein the received at least one statement is not a commit statement, wherein a task of the tasks includes execution of a read operation by:

receive a pointer to a data cell to be read;
add the data cell to a read vector:
determine whether there is at least one write operation dependent on the read operation, wherein a dependent write operation is executed by a transaction different from the transaction initiated by the client; and
for each dependent write operation having a commit pause placed on the data cell to be read, waiting for the commit pause to be released; and
return the client an acknowledgement that the transaction is committed, wherein the acknowledgement is returned upon validation of the transaction, wherein the transaction is validated in a pessimistic manner, and wherein the at least one received statement is a commit statement.

16. The system of claim 15, wherein the one or more processors are further configured to:
determine whether the at least one received statement is a commit statement.

17. The system of claim 15, wherein executing the transaction in an optimistic manner includes allowing statements of other transactions to independently access same data cells in the database system being modified by tasks of the at least one received statement.

18. The system of claim 15, wherein validation of a transaction in a pessimistic manner includes waiting for other transactions to commit.

19. The system of claim 15, wherein the one or more processors, when executing tasks in each of the at least one received statement are configured to:
determine nodes participating in an execution of tasks of the statement;
send the tasks to the determined participating nodes; and
send processing results of the statement to the client.

20. The system of claim 15, wherein the transaction includes a collection of statements, each of the least one statement causes execution of one or more tasks.

21. The system of claim 20, wherein a task includes execution of at least one read operation, at least one write operation, or both.

22. The system of claim 15, wherein the one or more processors are further configured to:
place a dependency between a dependent transaction performing a write operation and the transaction requesting the read operation, when there is no commit pause placed on the data cell to be read.

23. The system of claim 22, wherein the one or more processors are further configured to:
read contents of the data cell when there are no dependent write operations, wherein a dependency between the read operation and write operation and a commit pause are released over time.

24. The system of claim 15, wherein the one or more processors, when the task a write operation, and, are configured to:
receive a pointer to a data cell to write data;
add the data cell to a write vector of the transaction; and
write new contents to the data cell in an uncommitted manner, thereby allowing original contents of the data cell and the new contents to co-reside.

25. The system of claim 15, wherein the one or more processors are further configured to:
cause a validation of each write operation performed during execution of the received transaction.

26. The system of claim 25, wherein the one or more processors are further configured to:
place a commit pause on any data cell modified by each of the write operation, wherein the commit pause enables an atomicity of a distributed transaction commitment;
scan a write vector of the transaction to identify data cells modified by each of the write operation;
for each identified data cells, identify conflicting read operations, wherein a conflicting read operation is a read operation of a transaction different from the transaction; and
place a dependency between the transaction and a transaction executing the conflicting read operation.

27. The system of claim 26, wherein the one or more processors are further configured to:
wait until dependencies between the transaction and conflicting read operation are released; and
return a validation acknowledgement.

28. A database system, comprising:
an interconnected network;
a plurality of nodes connected through an interconnected network; wherein each node comprises:
a storage including a plurality of data cells,
one or more processors; and
a memory, the memory containing instructions that, when executed by the one or more processors, configure the node to:
receive at least one statement that is a part of a transaction, wherein the transaction is initiated by a client to be executed on a database system;
execute tasks included in each of the at least one received statement in an optimistic manner, wherein the received at least one statement is not a commit statement, wherein a task of the tasks includes execution of a read operation by:
receive a pointer to a data cell to be read;
add the data cell to a read vector;
determine whether there is at least one write operation dependent on the read operation, wherein a dependent write operation is executed by a transaction different from the transaction initiated by the client; and
for each dependent write operation having a commit pause placed on the data cell to be read, waiting for the commit pause to be released; and
return the client an acknowledgement that the transaction is committed, wherein the acknowledgement is returned upon validation of the transaction, wherein the transaction is validated in a pessimistic manner, and wherein the at least one received statement is a commit statement.

29. The database system of claim 28, wherein a first node of the database system is configured to execute the least one statement of the transaction, and wherein a second node of the database system is configured to validate and commit the transaction.

* * * * *